3,158,665
BINARY POLYBLENDS OF STYRENE/ACRYLO-
NITRILE COPOLYMER AND CHLOROSULFO-
NATED ETHYLENE POLYMER
James A. Herbig and Ival O. Salyer, Dayton, Ohio, assignors to Monsanto Company, a corporation of Delaware
No Drawing. Filed July 21, 1960, Ser. No. 44,262
6 Claims. (Cl. 260—897)

This invention relates to styrene/acrylonitrile copolymers. In one aspect, this invention relates to styrene/acrylonitrile copolymer compositions comprising binary blends of styrene/acrylonitrile copolymers and chlorosulfonated ethylene polymers. In another aspect, this invention relates to methods for making binary blends of styrene/acrylonitrile copolymers and chlorosulfonated ethylene polymers.

Copolymers of styrene with acrylonitrile, especially those containing from 90 to 50 parts by weight styrene and, correspondingly, from 10 to 50 parts by weight acrylonitrile, constitute an important class of commercial resins, finding widespread use as an injection molding material. Unfortunately, styrene/acrylonitrile copolymers of this type have very limited flexibility. In fact, they are comparatively brittle materials which do not show a definite yield point. The tensile elongation of such styrene/acrylonitrile copolymers is of the order of only a few percent and the flexural deflection is very small. Thus, many styrene/acrylonitrile copolymers lack toughness. Although plasticizers can be used to improve toughness of styrene/acrylonitrile copolymers, the plasticized copolymer invariably has a low heat distortion point or softening point which restricts its use and the plasticizers tend to exude from the copolymer over a period of time. Further, styrene/acrylonitrile copolymers are flammable, and burn readily when ignited.

We have discovered that the toughness characteristics of styrene/acrylonitrile copolymers can be improved by blending into the styrene/acrylonitrile copolymers a small amount of a chlorosulfonated ethylene polymer.

An object of this invention is to provide improved styrene/acrylonitrile copolymer compositions.

Another object of this invention is to provide binary polyblend compositions of styrene/acrylonitrile copolymers and chlorosulfonated ethylene polymer.

Another object of this invention is to improve the toughness properties of a styrene/acrylonitrile copolymer composition without significantly lowering the heat distortion temperature of said polymer.

Another object of this invention is to improve the toughness of a styrene/acrylonitrile copolymer composition without significantly reducing the tensile strength or the flexural strength of said copolymer.

Another object of this invention is to improve the flexural deflection of styrene/acrylonitrile copolymer compositions.

Another object of this invention is to reduce the burning rate, or render non-flammable, styrene/acrylonitrile copolymer compositions, Other aspects, objects, and advantages of this invention will be apparent from a consideration of the accompanying disclosure and the appended claims.

In accordance with this invention, improved styrene/acrylonitrile copolymer compositions are made by incorporating small amounts of chlorosulfonated ethylene polymer in said styrene/acrylonitrile copolymer to form a binary polyblend of the same. The novel binary polyblend compositions of this invention comprise a major proportion of a styrene/acrylonitrile copolymer and a minor proportion of a chlorosulfonated ethylene polymer. Ordinarily, the binary polyblends of this invention comprise from about 1% by weight to about 15% by weight of chlorosulfonated ethylene polymer and the remainder styrene/acrylonitrile copolymer. Preferably, the styrene/acrylonitrile copolymer polyblends of this invention contain from 2% by weight to 12% by weight of the chlorosulfonated ethylene polymer. Although the above stated proportions give useful as well as preferred compositions, other compositions outside the stated proportions can also be formed with fewer improvements in physical properties and with improvements to a lesser degree than are obtained in the above disclosed compositions. Compositions containing from 12–30% chlorosulfonated polyethylene have somewhat less than optimum physical properties but have excellent flame resistance.

The binary styrene/acrylonitrile copolymer compositions of this invention can be prepared by either mechanical methods or by polymerization methods to produce polyblends having a high degree of homogeneity. In the mechanical method, the styrene/acrylonitrile polymer and the preformed chlorosulfonated ethylene polymer are intimately admixed together on a conventional mixing machine of the type normally used for mixing rubber or plastics, e.g., a mill rolls, an extruder, or a Banbury mixer. Preferably, the styrene/acrylonitrile copolymer is first placed on the mill rolls and, after a smooth rolling bank has formed in the nip of the rolls, the chlorosulfonated ethylene polymer is added. If desired, the styrene/acrylonitrile copolymer and the chlorosulfonated ethylene polymer, each in a disintegrated or a divided form, can be admixed together to form a crude admixture which is then placed on the mill rolls. Regardless of the method by which the mixing of these polymers is accomplished, it is necessary that they be admixed together to work under sufficient heat and pressure to insure an efficient dispersion of the chlorosulfonated ethylene polymer in the styrene/acrylonitrile copolymer so as to form a completely homogeneous material. The temperature at which this working or mastication is conducted is not critical so long as the temperature is at least above that where the styrene/acrylonitrile fuses and not above the temperature where decomposition sets in. Usually a temperature above about 300° F. or 325° F. and less than about 350° F. or 375° F. is sufficient to obtain an adequately intimate combination of the materials. If desired, suitable minor ingredients can also be included in the binary polyblend composition of this invention, including such ingredients as fillers, dyes, pigments, stabilizers and the like. An HCl scavenging type stabilizer plus an antioxidant is especially desirable in the polyblend composition when the compounding is to be carried out at high temperature as in an extruder.

In the polymerization method of preparing the novel polyblend compositions of this invention, preformed chlorosulfonated ethylene polymer is admixed in the styrene and acrylonitrile monomers and the resulting material subjected to polymerization. For best results, this polymerization is carried to a high conversion, such as greater than 95% conversion to high molecular weight styrene/acrylonitrile copolymer. In preparing such a polymerization blend, the chlorosulfonated ethylene polymer should be thoroughly and intimately dispersed in the monomeric styrene and acrylonitrile prior to polymerization.

The foregoing procedures are used by way of example and various combinations of the same or other procedures, can be employed to form a binary polyblend composition containing a large proportion of styrene/acrylonitrile copolymer and a minor proportion of chlorosulfonated ethylene polymer. The preferred method for preparing the novel binary polyblend compositions of this invention is by mechanically mixing the preformed polymers. It will be understood in this specification and claims that the term "blend" or "polyblend" as used herein includes mechanical blends as well as blends prepared by polymerizing styrene and acrylonitrile in the presence of preformed chlorosulfonated ethylene polymer.

The copolymers of styrene/acrylonitrile used in the novel polyblend compositions of this invention include copolymers wherein styrene and acrylonitrile are the sole monomers subjected to copolymerization, as well as copolymers prepared from these comonomers in an amount preferably not exceeding 15 wt. percent of the total comonomers of styrene and acrylonitrile. Examples of such polymerizable unsaturated comonomers which may be present include α-methyl styrene, vinyl toluene, ethyl acrylate, vinyl chloride, butyl acrylate, methyl methacrylate, and the like. The copolymer produced, even if other polymerizable unsaturated comonomers are present should have a high molecular weight. The styrene/acrylonitrile copolymers used in this invention, comprise from 90 to 50 parts by weight styrene and, correspondingly, from 10 to 50 parts by weight acrylonitrile; however, other styrene/acrylonitrile compositions outside this range can also be used with less advantageous results.

The styrene/acrylonitrile copolymers employed in the binary polyblend compositions of this invention can be made by any of the known styrene/acrylonitrile copolymerization techniques from monomeric materials comprising styrene and acrylonitrile either with or without preformed chlorosulfonated polymer present. One common technique is mass polymerization wherein the only material present in the reaction mixture is the monomer plus any catalyst and any modifier that may be used to affect the molecular weight, plus chlorosulfonated ethylene polymer, if it is to be incorporated during the polymerization; and no added solvents or other reaction medium are present. Suitable catalysts for use are those that promote free radicals, e.g., peroxy type and azo type catalysts. Examples of such catalysts include benzoyl peroxide, diacetyl peroxide, ditertiary butyl peroxide, dimethyl phenyl hydroperoxy methane, and α,α'-azobisisobutyronitrile. The copolymerization can also be effected by the solvent polymerization technique which is similar to the mass polymerization technique except that a solvent for the monomers and/or polymers is also present during the polymerization. The copolymerization can also be effected advantageously by suspension or emulsion polymerization techniques. Each of these techniques involves use of a non-solvent for the monomer and polymer, but in the suspension technique the particles of monomer and ultimately the polymer are comparatively large, while in the emulsion procedure the particles of monomer and ultimately the polymer latex. For suspension polymerization, a reaction medium such as water is used together with a small amount of a suspending agent, for example, tricalcium phosphate, vinyl acetate-maleic anhydride copolymer product, or the like, to give a suspension of particles in the initial mixture which are not of sufficiently small size as to result in a permanently stable latex as a product. To effect emulsion polymerization, sufficient amount of emulsifying agent, for example, a water-soluble salt of a sulfonated long-chain alkyl aromatic compound is employed in suitable quantity along with vigorous agitation whereby an emulsion of the reactants in water is formed and the product is obtained in the form of a latex. The latex can then be coagulated, if desired, by known methods and the polymer separated from the water. In those embodiments of the invention wherein styrene and acrylonitrile are copolymerized in the presence of preformed chlorosulfonated ethylene polymer, the preformed polymer may tend to make it more difficult to form an emulsion than in the case of the monomers alone. However, the emulsion technique has a certain advantage, particularly in that a very rapid and complete conversion to a high molecular weight product is obtained. Conventional recipes and procedures for effecting mass, suspension, and emulsion copolymerization of styrene with acrylonitrile are so well known to those skilled in the art that they need not be reiterated here. Emulsion and suspension polymerization can be effected at temperatures which are chosen in accordance with the catalyst system used but which may, for example, be from 50° C. to 100° C. Mass polymerization is usually most advantageously effected at temperatures within the range of 25° C. to 125° C.

The chlorosulfonated ethylene polymers incorporated in the binary polyblend compositions of this invention are well known to those skilled in the art. For example, certain commercial products sold under the trade name of "Hypalon" are chlorosulfonated polyethylenes. Chlorosulfonated ethylene polymers are made by chlorination and sulfonation of normally solid high molecular weight polymers of ethylene. Suitable ethylene polymers usually have number average molecular weights of at least 500 and preferably above 15,000. Such ethylene polymers can be made readily by subjecting ethylene containing from 10 to 200 p.p.m. oxygen to polymerization at very high pressures, for example, 20,000 to 40,000 p.s.i. There are other methods for preparing solid polyethylenes, for example, by employing peroxide or azo catalysts and water or an organic liquid reaction medium along with moderately high pressures, for example, 5000 to 15,000 p.s.i. Also, as is well known in the art, ethylene polymers of greater rigidity and higher density can be prepared at relatively low pressures, e.g., less than 1000 p.s.i. using organo-metallic and metal oxide-supported catalysts. If desired, the ethylene polymer which is chlorosulfonated may be one which gives a copolymer of ethylene and an ethylenically unsaturated comonomer processed in an amount preferably not to exceed 15 wt. percent of the ethylene, for example, vinyl acetate, vinyl chloride, vinylidene chlorofluoride, and methyl methacrylate, propylene, butene-1, butadiene and isoprene.

The chlorosulfonation of the ethylene polymer can be effected in a number of different ways and one very suitable method for producing a preferred type of chlorosulfonated ethylene polymer is described in U.S. 2,586,363. As disclosed therein, polyethylene is chlorosulfonated to form a polymer having a preferred chlorine content of about 25% to 37% by weight and a preferred sulfur content of from 0.4% to 3% by weight. One very suitable chlorosulfonated polyethylene for use in this invention contains about 27.5 wt. percent chlorine and about 1.5 wt. percent sulfur. The chlorine and sulfur atoms are believed to be chemically combined with the hydrocarbon chain of the polymer with most of the chlorine substituted on the chain and the sulfur combined with the chain as —$SO_2Cl$ groups. This material contains about one chlorine atom per every 6 to 7 carbon atoms and one —$SO_2Cl$ group for every 90 to 130 carbon atoms. In the preparation of the chlorosulfonated polyethylene, the chlorosulfonation can be effected by reacting the polyethylene with chlorine and sulfur dioxide, with $SO_2Cl_2$, or with $SO_2Cl_2$ plus chlorine. Other procedures for making chlorosulfonated polyethylene are described in the prior art, for example, in U.S. Patents 2,212,786 and 2,405,971. Preferably, the chlorosulfonated polyethylenes employed in the binary polyblends of this invention have a chlorine content of from 10% to 50% by weight and a sulfur content of from 0.2% to 10% by weight. However, chlorinated polyethylenes containing about 30% chlorine and no sulfur may also be used effectively.

The styrene/acrylonitrile-chlorosulfonated ethylene polymer polyblend compositions of this invention, prepared as described herein, can also have included therein other additional materials, such as plasticizers, stabilizers, fillers, dyes, pigments, other polymers, and the like. These materials can be added to the preformed styrene/acrylonitrile copolymer and the preformed chlorosulfonated ethylene polymers by melting together or otherwise mixing the added materials with the polymers or copolymers, or can similarly be added to the blends of styrene/acrylonitrile copolymer with chlorosulfonated ethylene polymer, or can be present during the polymerization of styrene/acrylonitrile comonomers containing preformed chlorosulfonated ethylene polymer, provided that such presence does not adversely affect the polymerization process or the product to an undesirable extent.

The advantages, desirability, and usefulness of the present invention are illustrated by the following example.

EXAMPLE

Styrene/acrylonitrile copolymer polyblends containing varying proportions of chlorosulfonated ethylene polymer were prepared by mechanically milling the various mixtures on a 3 x 8 in. Thropp mill rolls at 174° C. A rough mix was first prepared from the preformed polymers in powdered or pelleted form in a stainless steel beaker and then this rough mix was placed on the heated mill rolls and thoroughly homogenized by intensive hot milling for 5 minutes or until an adequate dispersion was obtained. The blends were then sheeted and stripped from the mill rolls. After sufficient cooling, the sheets were cut into 1 to 2 inch squares for convenient feeding to an Abbe grinder for grinding into pellet size for injection molding on a 1-ounce Watson-Stillman machine.

The physical properties of the blends were then determined on the injection molded samples and are reported in Table I. These properties were determined according to the standard ASTM procedures, more specifically, tensile strength and elongation were determined according to ASTM D-882-46, flexural strength and deflection were determined according to ASTM D-790-49T, and notched impact strength was determined by the Izod method as set forth in ASTM D-256-47T.

adversely affecting the notched impact strength of the styrene/acrylonitrile copolymer. These binary polyblend compositions were translucent in appearance and could be readily injection molded to obtain products having good surface gloss.

Polyblend compositions of this invention can be subjected to injection or compression molding and other operations which are standard for styrene/acrylonitrile copolymers. These polyblends can be used to make molded structures as well as plastic sheets suitable for cutting or otherwise converted to an intended use. They can also be mixed with other materials, such as pigments, plasticizers, natural and synthetic resins, fillers, and the like.

Reasonable variation and modification of the invention as described are possible, the essence of which is that there have been provided binary polyblend compositions of styrene/acrylonitrile copolymers comprising a major amount of a styrene/acrylonitrile copolymer and a minor amount of a chlorosulfonated ethylene polymer and methods for preparing the same.

We claim:

1. A styrene/acrylonitrile copolymer polyblend composition comprising styrene/acrylonitrile copolymer and from 1% to 15% by weight of a chlorosulfonated ethylene polymer.

2. A styrene/acrylonitrile copolymer polyblend composition comprising styrene/acrylonitrile copolymer containing from 50% to 90% by weight styrene and, correspondingly, from 50% to 10% by weight acrylonitrile, based on the weight of comonomers polymerized, and from about 2% by weight to about 30% by weight of a chlorosulfonated ethylene polymer.

3. A styrene/acrylonitrile copolymer polyblend composition comprising styrene/acrylonitrile copolymer contain-

*Table I*

PROPERTIES OF STYRENE/ACRYLONITRILE COPOLYMER AND CHLOROSULFONATED ETHYLENE POLYMER POLYBLENDS

| Composition, Percent | | Tensile Properties | | | | Flexural Properties | | Notched Impact Strength, ft.-lb./in. |
|---|---|---|---|---|---|---|---|---|
| Styrene/acrylonitrile Copolymer [1] | Chlorosulfonated ethylene Polymer [2] | Yield | | Failure | | Strength, p.s.i. | Deflection, inches | |
| | | Strength, p.s.i. | Elongation, Percent | Strength, p.s.i. | Elongation, Percent | | | |
| 100.0 | | | | 11,400 | 1.8 | 18,374 | 0.24 | 0.53 |
| 97.5 | 2.5 | 11,124 | 6.7 | 9,847 | 11.7 | 20,700 | 0.30 | 0.52 |
| 95.0 | 5.0 | 10,877 | 6.7 | 8,364 | 24.0 | 19,795 | 0.80 | 0.57 |
| 90.0 | 10.0 | 9,836 | 6.7 | 8,479 | 8.4 | 18,103 | 0.80 | 0.53 |

[1] Bakelite C-11 styrene/acrylonitrile copolymer containing 72% by weight styrene and 28% by weight acrylonitrile obtained from the Bakelite Corporation.
[2] Hypalon S-2 chlorosulfonated polyethylene obtained from E. I. duPont de Nemours and Co.

The data in Table I clearly show the improvement in toughness to be obtained by blending a small amount of a chlorosulfonated polyethylene into a styrene/acrylonitrile copolymer. For example, the flexural deflection of the styrene/acrylonitrile copolymer was increased from 0.24 inch to a value greater than 0.80 inch, the limit of the particular test equipment used, by blending in 5.0 wt. percent and 10.0 wt. percent chlorosulfonated polyethylene. In addition, the blending of chlorosulfonated polyethylene in the styrene/acrylonitrile copolymer increased the percent elongation at failure for all concentrations of chlorosulfonated polyethylene, with the maximum increase being obtained at 5.0 wt. percent chlorosulfonated polyethylene, and the percent elongation increased from 1.8% to 24.0%. Although this increase of toughness properties was obtained with some slight loss in tensile strength at failure, there was obtained an increase in flexural strength at the lower concentrations of the chlorosulfonated polyethylene. It will be noted that these improvements in toughness properties were obtained without ing from 50% to 90% by weight styrene and, correspondingly, from 50% to 10% by weight acrylonitrile, based on the weight of comonomer polymerized, and from 1% to 15% by weight chlorosulfonated ethylene polymer.

4. A styrene/acrylonitrile copolymer polyblend composition comprising about 97.5% by weight of a styrene/acrylonitrile copolymer containing 72% by weight styrene and 28% acrylonitrile, based on the weight of comonomer polymerized, and about 2.5% by weight chlorosulfonated ethylene polymer.

5. A styrene/acrylonitrile copolymer polyblend composition comprising about 95% by weight of a styrene/acrylonitrile copolymer containing 72% by weight styrene and 28% by weight acrylonitrile, based on the weight of comonomers polymerized, and about 5% by weight chlorosulfonated ethylene polymer.

6. A styrene/acrylonitrile copolymer polyblend composition comprising about 90% by weight of a styrene/acrylonitrile copolymer containing 72% by weight styrene and 28% by weight acrylonitrile, based on the weight of comonomers polymerized, and about 10% by weight chlorosulfonated ethylene polymer.

References Cited in the file of this patent

UNITED STATES PATENTS

| | | | |
|---|---|---|---|
| 2,646,417 | Jennings | | July 21, 1953 |
| 2,693,459 | Fisk | | Nov. 2, 1954 |
| 2,854,425 | Boger et al. | | Sept. 30, 1958 |
| 2,956,980 | Law | | Oct. 18, 1960 |

FOREIGN PATENTS

| 24,041 | Australia | Dec. 24, 1953 |
|---|---|---|

UNITED STATES PATENT OFFICE
CERTIFICATE OF CORRECTION

Patent No. 3,158,665            November 24, 1964

James A. Herbig et al.

It is hereby certified that error appears in the above numbered patent requiring correction and that the said Letters Patent should read as corrected below.

Column 2, line 19, for "polymer" read -- copolymer --; column 3, lines 50 and 51, for "of monomer and ultimately the polymer latex" read -- are quite small and the product is a stable latex --.

Signed and sealed this 20th day of April 1965.

(SEAL)
Attest:

ERNEST W. SWIDER
Attesting Officer

EDWARD J. BRENNER
Commissioner of Patents